United States Patent Office 3,790,500
Patented Feb. 5, 1974

3,790,500
OXIDATIVE DEHYDROGENATION CATALYST
Darrell W. Walker, Bartlesville, Okla., assignor to
Phillips Petroleum Company
No Drawing. Filed May 6, 1971, Ser. No. 140,968
Int. Cl. B01j 11/82
U.S. Cl. 252—437                                   5 Claims

ABSTRACT OF THE DISCLOSURE

Organic compounds are dehydrogenated to compounds having a higher degree of unsaturation by contacting the feedstock in the vapor phase in the presence of an oxygen-containing gas with a catalyst containing at least one of the elements nickel, cobalt or iron in association with tin, phosphorus, and arsenic together with sufficient combined oxygen to satisfy the valence requirements of the components of the catalyst. Optionally, the catalytic compositions can contain minor amounts of alkali metal such as potassium. Representative of such conversions is the oxidative dehydrogenation of butane to butenes and butadiene. The conversion products are valuable compounds particularly useful as intermediates for the preparation of polymeric materials such as synthetic rubbers and the like.

---

The present invention relates to chemical compositions. More particularly, the invention relates to catalyst compositions, their preparation and the catalytic processes employing such compositions, e.g., processes for effecting the dehydrogenation of hydrocarbons.

Thermal noncatalytic and catalytic processes for converting organic compounds to compounds having a higher degree of unsaturation are known. The former are characterized by undesirable side reactions, low order of conversion and yields and poor selectivity to desired product. The catalytic processes are characterized by the particular catalytic material employed and the conditions under which the processes are operated, e.g., in the absence or presence of oxygen. While a number of such catalytic processes have attained some measure of commercial success, there is a continuing search for better catalytic materials which exhibit the high activity, high yield to desired product, high selectivity to desired product, extended longevity, high response to regeneration, especially in the presence of air, and which keep undesirable side reactions to a minimum; all characteristics of good dehydrogenation catalysts. The vexatious problem constantly faced by those skilled in the art is the identification and characterization of the compositions which are highly efficient dehydrogenation catalysts.

Among the more recently disclosed oxidative dehydrogenation catalysts are those which include halogens or halogen-releasing materials. Such catalysts exhibit many disadvantages in regard to equipment corrosion and expense of continuously feeding, recovery and recycling the relatively expensive halogen materials. Halogen-free catalytic materials continue to be the most desirable for use in dehydrogenation processes.

The present invention provides a novel catalyst and a novel process for the conversion of organic feedstocks to hydrocarbons having a higher degree of unsaturation and which have the same or lower number of carbon atoms as the organic feed. According to this invention, hydrocarbon feedstocks, for example, can be converted directly to hydrocarbons having a greater degree of unsaturation by contacting said feedstock under dehydrogenation conditions in the vapor phase in the presence of molecular oxygen with a calcined catalytic material comprising at least one metal selected from the group consisting of nickel, iron or cobalt in association with tin, phosphorus, arsenic and combined oxygen. Optionally, such catalysts can include minor amounts of alkali metal compound. Thus, paraffinic hydrocarbons can be converted in good yields to diolefins and/or monoolefins and the monoolefins can be converted to diolefins. The invention is particularly applicable for the production of diolefins from paraffins and particularly useful results are obtained by the dehydrogenation of butanes to butenes and butadiene.

The hydrocarbon feedstocks which are applicable for the oxidative dehydrogenation processes of the present invention comprise dehydrogenatable aliphatic hydrocarbons having from about 2 to about 12 carbon atoms per molecule and at least one

grouping, i.e., adjacent carbon atoms having at least one hydrogen atom on each carbon atom. Such hydrocarbons can be branched or unbranched and include paraffins as well a monoolefins. Particularly preferred are acyclic paraffins and monoolefins having 4 to 12 carbon atoms. The conversion of butane to butenes and butadiene, isopentane to isoamylenes and isoprene, and butenes to butadiene is presently considered most advantageous. Some specific examples of other feeds include isobutane, pentane, hexane, 2-methylhexane, octane, 2,4-dimethyloctane, 2-methylbutene-1, hexene-2, octene-1, 3-methylnonene-4, dodecene-1, and the like, including mixtures thereof.

The catalysts of the present invention comprise at least one of nickel, cobalt or iron in association with tin, phosphorus, arsenic and, optionally, at least one alkali metal or alkali metal compound. For simplicity, the nickel, cobalt and iron group is referred to as the ferrous metals of Group VIII, or merely as the ferrous metals. The elements contained in the catalysts of the invention are not necessarily in the elemental state but can be combined with sufficient oxygen to form one or more neutral compounds such as nickel stannate, cobalt phosphate, iron stannate, nickel oxide, iron oxide, nickel arsenate, etc., depending upon the proportions of the elements present. It is presently preferred that a catalyst of the present invention contain each of the above-mentioned elements in amounts shown on the following table:

| Element | Weight percent | |
|---|---|---|
| | Broad | Preferred |
| Ferrous metal | 26–75 | 30–45 |
| Tin | 1–50 | 14–35 |
| Phosphorus | 0.5–10 | 2.6 |
| Arsenic | 1–10 | 1–5 |
| Alkali metal | 0–6 | 1–4 |

The percentages shown above are based upon a total weight of the finished catalyst, and the difference between the total of the weights of the above-named elements and 100 percent is made up by its oxygen content in amounts sufficient to satisfy the valences of each of the elements in the catalyst.

These catalysts can also be supported on, or diluted with, conventional catalytic materials such as silica, alumina, boria, magnesia, titania, zirconia, and combinations thereof, as well as other similar conventional materials known in the art.

The catalysts of the present invention can be prepared by any suitable method. Conventional methods such as coprecipitation, impregnation, or dry mixing can be used.

In general, any method can be used which will provide a composition containing the above-described elements in the above-described proportions and which will have a catalytic surface area of at least about 1 square meter per gram. Thus, a ferrous metal compound, a tin compound, a phosphorus compound, and an arsenic compound can be combined in any suitable way and in any order.

In one preferred method of preparation, a solution of a ferrous metal compound, such as nickel nitrate, and a solution of a tin compound, such as potassium stannate, are coprecipitated by the addition of a potassium hydroxide solution. The resulting precipitate is suitably washed, treated with a phosphorus compound, such as phosphoric acid, dried and calcined. The arsenic is then incorporated into the catalyst by impregnation with an arsenic-containing compound such as arsenic acid.

In one alternative method of preparation, the phosphorus component can be introduced into the composition during the initial coprecipitation stage. It is generally preferred that the alkali metal (if added) be introduced at or prior to the ferrous metal compound-tin compound coprecipitation. It is also preferred that the arsenic component be added after the phosphorus component has already been incorporated. A final impregnation with arsenic, particularly after the solid catalyst is in the desired size and shape, is effective and convenient.

Substantially any ferrous metal, tin, phosphorus, arsenic and alkali metal compound can be employed in the preparation of the catalyst so long as none of the compounds are detrimental to the final oxidative dehydrogenation catalyst and so long as elements, other than ferrous metal, tin, phosphorus, alkali metal and oxygen, in the compounds used, are substantially removed from the final catalyst composition by prior washing or by volatilization. In some instances, however, small amounts of some other elements, which are involved in the preparation of the catalyst, can be tolerated in the final catalytic composition. For example, if a sulfate such as nickel sulfate or tin sulfate is employed in the preparation, small residual amounts of sulfur can be tolerated. Halogen residues, on the other hand, are less desirable in the catalyst. Generally, the preferred ferrous metal, tin, phosphorus, arsenic and alkali metal compounds or either the oxides of these elements or compounds are readily convertible to the oxide on calcination. Some examples of these are nickel nitrate, cobalt acetate, phosphoric acid, ferric nitrate, nickel stannate, potassium stannate, nickel arsenic, stannic chloride, stannous oxalate, arsenic acid, potassium hydroxide, rubidium nitrate, sodium carbonate, sodium arsenate, lithium phosphate, cesium tartrate, and the like, including mixtures thereof.

Regardless of the specific sequence of steps utilized in the catalyst preparation method, the last stage of the preparation is activation by calcination in an oxygen-containing gas such as air at a temperature of 900 to 1800° F. for 1 to 24 hours, or until the catalyst is active for oxidative dehydrogenation. The solid catalyst compositions can be conveniently formed and utilized in any conventional shape or form such as tablets, extrudates, granules, powder, agglomerates, and the like.

The dehydrogenatable hydrocarbon feedstocks are converted according to the process of the present invention at temperatures in the range of from about 800 to about 1300° F., preferably from about 950 to about 1200° F.; at any convenient pressure such as from about 7 to about 250 p.s.i.a.; and at a volumetric hydrocarbon:oxygen ratio of about 1:1 to about 1:4. The presence of steam is frequently beneficial and volumetric steam:hydrocarbon ratios up to 50:1 can be used. The hydrocarbon feed rate will generally be in the range of from about 50 to about 5,000 GHSV. The fixed catalyst bed is the preferred mode of contact, but other modes, such as a fluidized bed, can also be used.

The dehydrogenation process is ordinarily carried out by forming a mixture, preferably a preheated mixture, of a hydrocarbon feed, the oxygen-containing gas, and the steam (if used) and passing this mixture over the catalyst at the desired temperature. The effluent from the reaction zone is subjected to any suitable separation method to isolate and recover the desired product. Unconverted feeds or partially converted materials can be recycled.

The catalysts of the present invention can be utilized for long periods of time without regeneration. However, when regeneration becomes necessary, this can be simply accomplished by merely cutting off the flow of the hydrogenatable feedstock and allowing the catalyst to be contacted with the oxygen and steam for a sufficient period of time to restore substantial activity to the catalyst.

Generally, at least trace amounts of oxygenated products, other than carbon oxides and water, are also formed in these reactions. For example, compounds such as furan, acetaldehyde, furfural, and acetic acid and the like can be obtained. Some carbon oxides will be formed as well as some cracking products. In some instances, butadiene can be formed as a by-product for oxidative dehydrogenation of isopentane to isoprene.

The invention can be illustrated by the following examples.

EXAMPLE I

Preparation of catalysts

Preparation of Ni/Sn/P/As/O invention catalyst: 1160 g. of $NiNO_3 \cdot 6H_2O$, 400 g. $K_2SnO_3 \cdot 3H_2O$, and 289 g. 85% KOH were each dissolved in water. The three solutions were then added, simultaneously and dropwise, into a stirred container of water while maintaining the pH in the range 8–9. The resulting wet gel was filtered, and washed sufficiently with distilled water to reduce the potassium content to the desired level. The wet gel was then intimately mixed with an aqueous solution containing 62 g. of $H_3PO_4$ (85 percent). The mixture was then dried at 220° F., calcined at 1100° F. for 3 hours, then crushed to a 20–40 mesh screen size. The Ni/Sn/P/O composition contained 42% Ni, 27% Sn, 3.1% P, and 0.63% K, by weight. It had a Ni:Sn atomic ratio of about 3:1 and a surface area of 155 m.$^2$/g.

A 5 g. portion of the above-prepared Ni/Sn/P/O composition was then impregnated with arsenic by contact with 10 cc. of an aqueous solution containing 0.236 g. $H_3AsO_4$. The impregnated solid catalyst was then dried at 220° F., and calcined at 1400° F. for 3 hours. It contained about 2.5 weight percent As.

Another 5 g. portion of the above-prepared Ni/Sn/P/O composition was similarly impregnated but with only 0.047 g. $H_3AsO_4$. The finished catalyst contained about 0.5 weight percent As.

Preparation of Ni/Sn/As/O control catalyst: 80 g. $K_2SnO_3 \cdot 3H_2O$, 232 g. $NiNO_3 \cdot 6H_2O$, and 59 g. KOH (85 percent) were each dissolved in water. The three solutions were then added, simultaneously and dropwise, to a stirred container of water while maintaining the pH at about 7–9. The wet gel was filtered and washed. One-fourth of the wet gel was intimately mixed with 2.2 g. of $H_3AsO_4$ in 35 cc. water, then dried at 220° F., calcined at 1100° F. for 3 hours, crushed and screened to 20–40 mesh. The catalyst contained 42% Ni, 26% Sn, 2% K, and 4.4% As. The Ni:Sn atomic ratio was about 3:1.

EXAMPLE II

Oxidative dehydrogenation of butane

Each of the four catalysts prepared above was used in the oxidative dehydrogenation of butane in separate runs. The runs were carried out in a fixed bed reactor at 1100° F. and at atmospheric pressure. The space rates for the butane, air, and steam were 500, 2,500 and 5,000 GHSV, respectively. The effluent streams were sampled after 12 hours on-stream and analyzed. The results of these runs with each of these catalysts are shown in Table I.

TABLE I

[Oxidative dehydrogenation of butane]

| | Run 1 | Run 2 | Run 3 | Run 4 |
|---|---|---|---|---|
| Catalyst | Ni/Sn/P/As/O | Ni/Sn/P/As/O | Ni/Sn/P/O | Ni/Sn/As/O |
| Ni:Sn atomic ratio | 3:1 | 3:1 | 3:1 | 3:1 |
| K, wt. percent | 0.63 | 0.63 | 0.63 | 2 |
| P, wt. percent | 3 | 3 | 3 | 0 |
| As, wt. percent | 2.5 | 0.5 | 0 | 4.4 |
| Conversion, percent | 47.9 | 45.3 | 39.3 | 31 |
| Yields, mol percent: | | | | |
| Butadiene | 20.7 | 20.9 | 19.0 | 11.5 |
| Butenes | 12.2 | 8.3 | 5.5 | 5.1 |
| Butadiene and butenes | 32.9 | 29.2 | 24.5 | 16.6 |
| Cracked products | 6.3 | 5.8 | 4.7 | 4.1 |
| Carbon oxides | 8.7 | 10.3 | 10.1 | 10.0 |
| Modivity, mol percent:[1] | | | | |
| To butadiene | 43.2 | 46.2 | 46.8 | 37 |
| To butadiene and butenes | 68.7 | 64.4 | 62.1 | 54 |

[1] Modivity is a simplified selectivity based on analysis of gas phase products for converted hydrocarbons, oxides of carbon and unconverted feed, NOTE.—As used herein, conversion and yield are reported on same basis as modivity.

The data in Table I show that the invention catalysts in invention Runs 1 and 2 provide superior results in the oxidative dehydrogenation of butane when compared to the closely related control catalysts of Run 3 and Run 4. Comparing the results of Run 1 with Run 3 shows that the addition of arsenic to the Ni/Sn/P/O catalyst increased the conversion from about 39 to about 48 percent with no increase in combined cracked and oxidized products. The bulk of the increased conversion went to butenes production.

Comparing invention Runs 1 and 2 with control Runs 3 and 4 show that to obtain the benefits of the improved catalyst composition, both phosphorus and arsenic must be present; leaving out either of these produces inferior results.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. An oxidative dehydrogenation catalytic material consisting essentially of from about 26 to about 75 weight percent, based on weight of catalytic material, of at least one ferrous metal selected from the group consisting of nickel, cobalt and iron in association with from about 1 to about 50 weight percent, based on weight of catalytic material of tin; from about 0.5 to about 10 weight percent, based on weight of catalytic material of phosphorus; from about 1 to about 10 weight percent, based on weight of catalytic material, of arsenic and from 0 to about 6 weight percent, based on weight of catalytic material, of at least one alkali metal; and wherein at least one of said ferrous metal, said tin, said phosphorus, said arsenic or said alkali metal is combined with oxygen.

2. A catalytic material according to claim 1 wherein the amount of said ferrous metal is in the range of about 30 to about 45 weight percent; the amount of said tin is in the range of about 14 to about 35 weight percent; the amount of said phosphorus is in the range of about 2 to 6 weight percent; the amount of said arsenic is in the range of about 1 to about 5 weight percent; and the amount of said alkali metal is in the range of about 1 to about 4 weight percent.

3. A catalytic material according to claim 1 wherein said ferrous metal is nickel.

4. A catalytic material according to claim 3 wherein said alkali metal is potassium.

5. A catalytic material according to claim 4 consisting essentially of 42 weight percent nickel, 27 weight percent tin, 3.1 weight percent phosphorus, and 0.63 weight percent potassium, which after calcining is impregnated with 2.5 weight percent arsenic.

References Cited

UNITED STATES PATENTS

| 3,642,930 | 2/1972 | Grasselli et al. | 260—680 |
| 3,414,631 | 12/1968 | Grasselli et al. | 260—680 |
| 3,480,564 | 11/1969 | O'Brien et al. | 252—435 |
| 3,522,299 | 7/1970 | Takenaka et al. | 260—533 |
| 3,555,105 | 1/1971 | Nolan et al. | 260—680 |

PAUL M. COUGHLAN, JR., Primary Examiner

U.S. Cl. X.R.

260—680 E, 683.3